United States Patent [19]

Puyenbroek et al.

[11] Patent Number: 6,111,031
[45] Date of Patent: Aug. 29, 2000

[54] FILLED POLYETHERIMIDE RESIN COMPOSITIONS

[75] Inventors: Robert Puyenbroek, Bergen op Zoom, Netherlands; Darryl Nazareth, Flanders, N.J.

[73] Assignee: General Electric Company, Pittsfield, Mass.

[21] Appl. No.: 08/987,453

[22] Filed: Dec. 9, 1997

[51] Int. Cl.[7] ............................ C08F 283/04; C08G 69/48
[52] U.S. Cl. ............................ 525/422; 524/261; 524/401; 524/423; 524/425; 524/430; 524/432; 524/436; 524/437; 524/492; 525/55; 525/132; 525/437; 525/540
[58] Field of Search ........................... 524/261, 401, 524/423, 425, 430, 432, 436, 437, 492; 525/55, 132, 422, 437, 540

[56] References Cited

U.S. PATENT DOCUMENTS

| | | |
|---|---|---|
| 3,803,085 | 4/1974 | Takehoshi et al. . |
| 3,814,869 | 6/1974 | DeLuca . |
| 3,847,867 | 11/1974 | Heath et al. . |
| 3,850,885 | 11/1974 | Takekoshi et al. . |
| 3,852,242 | 12/1974 | White . |
| 3,855,178 | 12/1974 | White et al. . |
| 3,905,942 | 9/1975 | Takekoshi et al. . |
| 3,972,902 | 8/1976 | Heath et al. . |
| 3,983,093 | 9/1976 | Williams, III et al. . |
| 4,455,410 | 6/1984 | Giles, Jr. . |

FOREIGN PATENT DOCUMENTS

| | | |
|---|---|---|
| 423510 | 4/1991 | European Pat. Off. . |
| 627457 | 12/1994 | European Pat. Off. . |

*Primary Examiner*—Samuel A. Acquah

[57] ABSTRACT

A thermoplastic resin composition that contains a polyetherimide resin, a mineral filler and a gloss-enhancing additive selected from linear polysiloxane polymers, polyethylene resins and crystalline thermoplastic resins imparts improved surface gloss to shaped articles molded therefrom.

22 Claims, No Drawings

FILLED POLYETHERIMIDE RESIN COMPOSITIONS

FIELD OF THE INVENTION

The invention relates to filled thermoplastic polyetherimide resin compositions that impart improved surface gloss to articles molded therefrom.

BRIEF DESCRIPTION OF THE PRIOR ART

Polyetherimide resins impart physical properties, for example, resistance to elevated temperature, that make them appropriate for use in high heat applications. Shaped articles molded from polyetherimide resin compositions typically exhibit high surface gloss. Polyetherimide resin compositions that contain a mineral filler are known, see, for example EP 627457 and EP 423510. Such filled polyetherimide resin compositions are said to provide high performance at reduced cost, but the addition of the filler has been found to result in a dramatic decrease in the surface gloss of articles molded from the filled resin compositions. Such filled polyetherimide resin compositions may therefore be inappropriate for use certain applications, that is, wherein molded articles that exhibit both high temperature performance and a high gloss surface appearance are required.

Filled polyetherimide resins compositions would enjoy a wider range of applicability if the surface gloss of articles molded from such compositions could be improved.

SUMMARY OF THE INVENTION

The present invention is directed to a thermoplastic resin composition comprising:
(a) a polyetherimide resin,
(b) an inert particulate filler, and
(c) a gloss-enhancing additive selected from the group consisting of linear polysiloxane polymers, polyethylene resins crystalline thermoplastic resins and mixtures thereof, in an amount that is effective to improve the surface gloss of articles molded from the thermoplastic resin composition.

The composition of the present invention imparts improved surface gloss to articles molded therefrom.

In a second aspect, the present invention is directed to a method of make a thermoplastic resin article having improved surface gloss, comprising molding the resin composition of the present invention under conditions effective to subject the resin composition to a shear rate of greater than 8,500 reciprocal seconds ("$s^{-1}$").

The method of the present invention imparts improved surface gloss to articles molded thereby.

DETAILED DESCRIPTION OF THE INVENTION

In a preferred embodiment, the polyetherimide resin composition of the present invention comprises, based on 100 parts by weight ("pbw") of the combined amount of the polyetherimide resin and the particulate inert filler, from 35 to 99.9 pbw, more preferably from 60 to 90 pbw, and, even more preferably, from 70 to 80 pbw of the polyetherimide resin, from 0.1 to 65 pbw, more preferably from 10 to 40 pbw, and, even more preferably, from 20 to 30 pbw of the inert particulate filler and from 0.01 to 10 pbw, more preferably from 0.1 to 6 pbw, of the gloss-enhancing additive.

In a preferred embodiment, the thermoplastic resin composition consists essentially of the polyetherimide resin, the inert particulate filler and the gloss-enhancing additive.

Polyetherimide resins suitable for use as the polyetherimide resin component of the thermoplastic resin of the composition of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

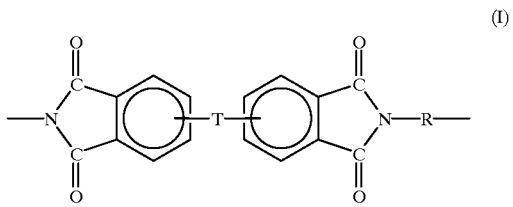

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

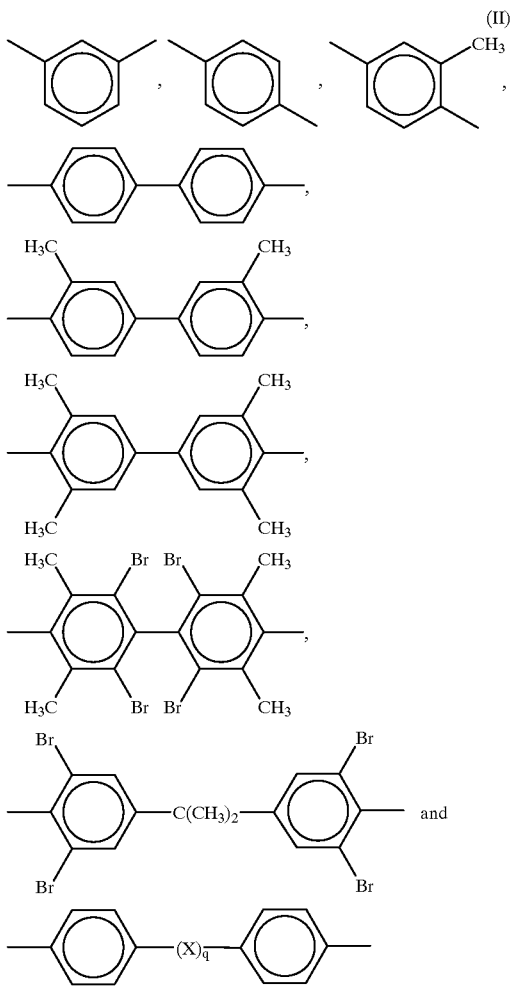

wherein X is a member selected from the group consisting of divalent radicals of the formulae (III):

(III)

$$-C_yH_{2y}-, \quad -\overset{O}{\underset{}{C}}-, \quad -\overset{O}{\underset{O}{S}}-, \quad -O- \text{ and } -S-$$

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

(IV)

where Q is a member selected from the group consisting of formulae (V):

(V)

$$-C_{y'}H_{2y'}-, \quad -\overset{O}{\underset{}{C}}-, \quad -\overset{O}{\underset{O}{S}}-,$$

$$-O- \text{ and } -S-$$

where y' is an integer from about 1 to about 5.

In one embodiment, the polyethermide resin may be a copolymer which, in addition to the etherimide units described above, further contains polyimide repeating units of the formula (VI):

(VI)

wherein R is as previously defined for formula (I) and M is selected from the group consisting of formula (VII):

(VII)

formula (VIII):

(VIII)

and formula (IX):

(IX)

Polyetherimide resins are made by known methods, such as, for example, those disclosed in U.S. Pat. Nos. 3,847,867, 3,814,869, 3,850,885, 3,852,242 3,855,178 and 3,983,093, the disclosures of which are hereby incorporated herein by reference.

In a preferred embodiment, the polyetherimide resin is made by the reaction of an aromatic bis(ether anhydride) of the formula (X):

(X)

with an organic diamine of the formula (XI):

$$H_2N-R-NH_2 \quad (XI)$$

wherein T and R are defined as described above in formula (I). In general the reactions can be carried out employing well-known solvents, e.g., o-dichlorobenzene, m-cresol/toluene and the like to effect interaction between the anhydride of formula (X) and the diamine of formula (XI), at temperatures from about 100° C. to about 250° C. Alternatively, the polyethermide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; -4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

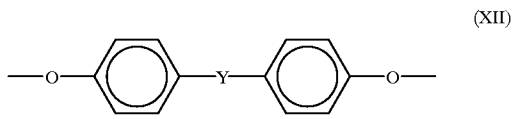

(XII)

wherein each Y is independently selected from the group consisting of: formulae (XIII):

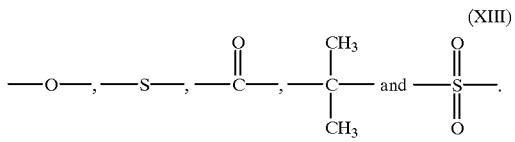

(XIII)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyethermide resin falling within the scope of formula (I) is one comprising repeating units wherein R is paraphenylene, metaphenylene, or mixtures of paraphenylene and metaphenylene and T is a group of the formula —O—Z—O— wherein Z has the formula (XIV):

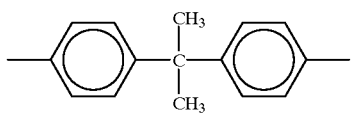

(XIV)

and wherein the divalent group (XIV) bridges the 3,3' positions of the aryl rings of the respective aryl imide moieties of formula (I).

Generally, useful polyetherimide resins have an intrinsic viscosity [η] greater than about 0.2 deciliters per gram, preferably of from about 0.35 to about 0.7 deciliters per gram measured in m-cresol at 25° C.

In a preferred embodiment, the polyetherimide resin of the present invention resin has a weight average molecular weight of from about 10,000 to about 75,000 grams per mole ("g/mol"), more preferably from about 10,000 to about 65,000 g/mol, even more preferably from about 10,000 to about 55,000 g/mol, as measured by gel permeation chromatography, using a polystyrene standard.

The inert particulate filler component of the thermoplastic resin composition of the present invention may be any particulate material that is substantially inert under the anticipated conditions under which the resin composition of the present invention is to be processed and under the anticipated conditions under which articles molded from the resin composition of the present invention are to be used.

In a preferred embodiment, the inert particulate filler is a mineral filler. Mineral fillers are known in the art and are available from a number of commercial sources. Mineral fillers suitable for use as the inert particulate filler component of the composition of the present invention include, for example, alumina, barium carbonate, barium sulfate, barium titanate, barium trioxide, bismuth trioxide, calcium carbonate, magnesium silicate, strontium ferrite, titanium dioxide, wollastonite, zinc oxide and mixtures thereof.

In a preferred embodiment, the inert particulate filler of the composition of the present invention comprises barium sulfate.

In a preferred embodiment, the inert particulate filler of the composition of the present invention has an average particle size of from about 0.2 micrometer ("μm") to about 40 μm, more preferably from about 0.2 μm to about 7.5 μm.

In a first preferred embodiment, the gloss enhancing additive component of the composition of the present invention comprises one or more linear polysiloxane, fluids. Suitable polysiloxane fluids are known compounds that are made by known methods and are commercially available from a number of sources. Preferred polysiloxane fluids include poly(dimethylsiloxane) fluids and a poly(methyl hydrogen siloxane) fluids. In a highly preferred embodiment, the polysiloxane fluid comprises a methyl-terminated poly(dimethyl siloxane) fluid or a poly(methyl hydrogen siloxane) fluid. Preferred polysiloxane fluids are those having a number average molecular weight of from about 1,000 to about 20,000 g/mol.

In a highly preferred embodiment, the composition of the present invention comprises a gloss enhancing amount of from 0.01 to 2.0 pbw, more preferably 0.1 to 1.0 pbw, of the polysiloxane fluid, based on 100 pbw of combined amount of the polyetherimide resin and the inert particulate filler.

In a second preferred embodiment, the gloss enhancing additive component of the composition of the present invention comprises one or more polyethylene, resins, more preferably one or more high density polyethylene resins.

Suitable poly(ethylene) resins are known compounds made by known methods and are commercially available from a number of sources.

In a highly preferred embodiment, the composition of the present invention comprises a gloss enhancing amount of from 0.5 to 8 pbw, more preferably 2 to 6 pbw, of the poly(ethylene) resin, based on 100 pbw of combined amount of the polyetherimide resin and the inert particulate filler.

In a third preferred embodiment, the gloss enhancing additive component of the composition of the present invention comprises a crystalline thermoplastic polymer. Suitable crystalline polyamide resins are known compounds that are made by known methods and are commercially available from a number of sources.

In one preferred embodiment, the crystalline thermoplastic resin comprises one or more crystalline thermoplastic polyamide resins, preferably one or more linear aliphatic polyamide homopolymers or copolymers. In a preferred embodiment, the crystalline thermoplastic polyamide is one or more aliphatic linear polyamide homopolymer resin selected from nylon resins. Suitable nylon resins include, for example, nylon 6, nylon 4,6, nylon 6,6, nylon 6,9, nylon 6,10, nylon 6,12 and nylon 12,12 resins.

In a highly preferred embodiment, the crystalline polyamide resin is nylon 6 or nylon 6,6.

In a preferred embodiment, the crystalline polyamide resin has a weight average molecular weight of from about 50,000 to about 150,000 g/mol.

In an alternative preferred embodiment, the crystalline thermoplastic resin comprises a crystalline thermoplastic polyester resin. Suitable polyester resins are known compounds that are made by known methods and are commercially available from a number of sources. Polyester resins are typically obtained through the condensation or ester interchange polymerization of a diol or diol equivalent with a diacid or diacid equivalent and each comprise recurring structural units according to formula (XV):

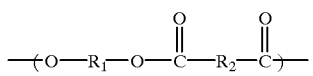

(XV)

wherein:
R$_1$ represents the residue of the diol or diol equivalent ("diol residue"),
R$_2$ represents the residue of the diacid or diacid equivalent ("diacid residue"), and each R$_1$ and R$_2$ is independently a divalent acyclic hydrocarbon radical, a divalent alicyclic hydrocarbon radical or a divalent aromatic hydrocarbon radical.

As used herein, the terminology "acyclic hydrocarbon radical" means a straight chain or branched saturated hydrocarbon radical, preferably containing from 2 to 12 carbon atoms per radical, such as, for example, dimethylene, trimethylene, tetramethylene, hexamethylene and octamethylene.

As used herein, the terminology "alicyclic hydrocarbon radical" means a hydrocarbon radical containing one or more saturated hydrocarbon rings, preferably containing from 4 to 10 carbon atoms per ring, per radical which may optionally be substituted on one or more of the rings with one or more alkyl or alkylene groups, each preferably containing from 2 to 6 carbon atoms per group and which, in the case of two or more rings, may be fused rings, such as, for example, 2,2,4,4-tetramethyl-1,3-cyclobutylene, 1,4-cyclohexylene, cyclohexylene-1,4-dimethylene, 1,4-cyclooctylene.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing from 2 to 6 carbon atoms per group and which, in the case of two or more rings, may be fused rings, such as, for example, 1,2-phenylene, 1,3-phenylene, 1,4-phenylene, 2,6-naphthalene, 2,7-phenathrylene.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol; alicyclic diols such as, for example, 2,2,4,4-tetramethyl-1,3-cyclobutane diol, 3,4-cyclopentanediol, 1,4-cyclohexanedimethanol, including cis-1,4-cyclohexanedimethanol and trans-1,4-cyclohexanedimethanol; and aromatic diols such as, for example, bisphenol A and hydroquinone. Suitable diol equivalents include corresponding esters and ethers, such as for example, dialkyl esters and diaryl esters.

Suitable diacids include, for example, dicarboxylic acids, such as, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid cis-1,4-cyclohexane dicarboxylic acid, trans-1,4-cyclohexane dicarboxylic acid, 4,4'-bisbenzoic acid, naphthalene-2,6-dicarboxylic acid. Suitable diacid equivalents include, for example, corresponding anhydride, ester or halide derivatives, such as, for example, phthalic anhydride, dimethyl terephthalate, succinyl chloride.

In a preferred embodiment, the crystalline thermoplastic polyester resin is a poly(alkylene phthalate) resin, more preferably a poly(ethylene terephthalate) resin or a poly (butylene terephthalate) resin, most preferably a poly (ethylene terephthalate) resin.

In a preferred embodiment, the polyester resin has a number average molecular weight of from 10,000 to 100,000, more preferably 15,000 to 50,000, as measured by gel permeation chromatography using a polystyrene standard.

In a highly preferred embodiment, the composition of the present invention comprises a gloss enhancing amount of from 0.05 to 10 pbw, more preferably 0.1 to 5 pbw, of the crystalline thermoplastic polymer, based on 100 pbw of combined amount of the polyetherimide resin and the inert particulate filler.

The thermoplastic resin composition of the present invention may, optionally, also contain various additives which are well known in the art, such as antioxidants, UV absorbers, light stabilizers, flame retardant additives, lubricants, plasticizers, pigments, dyes, colorants and antistatic agents.

The preparation of the compositions of the present invention is normally achieved by combining the ingredients under conditions suitable for formation of a blend of the components. Such conditions typically include solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful shaped articles, such as, for example, heat resistant containers, by a variety of means such as, for example, injection molding and extrusion.

The thermoplastic resin composition of the present invention may be molded under typical injection molding conditions, wherein the resin composition is subjected to a shear rate of from 3,000 to 8500 s$^{-1}$ during injection of the resin composition into a mold. In a preferred embodiment of the present invention, the thermoplastic resin composition of the present invention is injection molded under "high shear rate" conditions that are effective to subject the thermoplastic resin composition to a shear rate of greater than 8,500 s$^{-1}$, more preferably greater than or equal to 10,000 s$^{-1}$, even more preferably greater than or equal to 12,000 s$^{-1}$, and still more preferably greater or equal to 15,000 s$^{-1}$ during injection of the resin composition into a mold.

The shear rate to which a resin composition is subjected under injection molding conditions may be calculated according to methods known in the art, such as for example, according to equation 1:

$$\text{Shear rate} = 4\,V/\pi R^3 \tag{1}$$

which has been found to be applicable to flow of the resin composition through an injection nozzle, wherein V is the volumetric flow rate of resin composition though the injection nozzle and R is the internal radius of the injection nozzle.

Injection molding the resin composition of the present invention under high shear rate conditions provides enhanced surface gloss to articles made thereby.

EXAMPLES 1–9

Comparative Examples C1

The respective thermoplastic resin compositions of Examples 1–9 of the present invention and Comparative Example C1 were each made by combining the components described below in the relative amounts (each expressed in pbw, based on the 100 pbw of the respective thermoplastic resin composition) set forth in TABLES I–IV. The components used in the thermoplastic resin compositions were as follows:
PEI: Polyetherimide resin made by condensation of 2,2-bis [4-(3,4-dicarboxyphenoxy)phenyl]propane dianhydride with metaphenylene diamine and having a weight average molecular weight of about 52,000 g/mol,
BaSO$_4$: Barium sulfate (Blanc Fixe) from Polar Minerals),
PMHS: A methyl-terminated poly(methyl hydrogen siloxane) polymer having a weight average molecular weight of about 7,000 g/mol (DF1040, GE Silicones),
PMDS: A methyl-terminated poly(dimethyl siloxane) polymer having a weight average molecular weight of about 40,000 g/mol (SF1198, GE Silicones),
PE: A high density polyethylene homopolymer.
Nylon 6: Nylon 6 resin having a having an average molecular weight of about 90,000 g/mol (Allied Signal, Inc.)
Nylon 6,6: Nylon 6,6 resin a having an average molecular weight of about 80,000 g/mol (Allied Signal, Inc.) and
PET: Poly(ethylene terephthalate) resin having a having a weight average molecular weight of about 60,000 g/mol (grade 3948, E.I. du Pont de Nemours & Co.).

The components of the compositions of Examples 1–9 and Comparative Example C1 were combined and blended in an Egan 2.5 inch single screw extruder at a temperature of about 340–360° C. The compositions so formed were pelletized and, in a series of runs, each of the compositions was then injection molded using a Newbury 150T injection molding machine to form specimens for gloss testing.

Gloss was measured at 60° according to ASTM D523. Results of the gloss testing are set forth below in TABLES I-II for each of the compositions of Examples 1–9 and Comparative Example 1.

TABLE I

|  | CEx# C1 | Ex# 1 | Ex# 2 | Ex# 3 | Ex 4 |
|---|---|---|---|---|---|
| PEI | 80 | 77 | 75 | 79.8 | 79.8 |
| BaSO$_4$ | 20 | 20 | 20 | 20 | 20 |
| PE | — | 3 | 5 | — | — |
| PMHS | — | — | — | 0.2 | — |
| PDMS | — | — | — | — | 0.2 |
| Gloss at 60° | 26 | 29 | 32 | 33 | 27 |

TABLE II

|  | EX# 5 | Ex# 6 | Ex# 7 | Ex# 8 | Ex# 9 |
|---|---|---|---|---|---|
| PEI | 79.5 | 79 | 79 | 79 | 77 |
| BaSO$_4$ | 20 | 20 | 20 | 20 | 20 |
| Nylon 6 | 0.5 | 1 | — | — | — |
| Nylon 6,6 | — | — | 1 | — | — |
| PET | — | — | — | 1 | 3 |
| Gloss at 60° | 29 | 43 | 43 | 43 | 43 |

The compositions of examples 1–9 each exhibit improved gloss compared to comparative example C1. The compositions of examples 5–9, each of which contains a crystalline thermoplastic resin as the gloss-enhancing additive, provide particularly dramatic improvements in surface gloss compared to Comparative Example C1.

EXAMPLES 10–13

The compositions of examples 10–12 were made in the same manner as described above in regard to Examples 1–9 and Comparative Example C1.

The components of the compositions of Examples 10–12 were combined and blended in an Egan 2.5 inch single screw extruder at a temperature of about 340–360° C. The compositions so formed were pelletized and, in a series of runs, each of the compositions was then injection molded using a Newbury 150T injection molding machine, under conditions effective to subject the resin compositions to shear rates of 8,500 s$^{-1}$, 10,000 s$^{-1}$, 12,000 s$^{-1}$ and 15,000 s$^{-1}$, to form specimens for gloss testing. Shear rates were calculated according to equation (1) above for flow of the resin through the injection nozzle of the injection molding machine. The volumetric flow rate of the resin composition was calculated by multiplying the weight of resin composition injected into the mold by the specific gravity of the resin composition and dividing the product by the injection time.

The relative amounts of the components of Examples 10–12, expressed in pbw, based on 100 pbw of the respective thermoplastic resin composition and the results of the gloss testing for the test specimens formed from the compositions under various shear rate conditions are set forth below in TABLE III.

TABLE III

|  | Ex# 10 | Ex# 11 | Ex# 12 |
|---|---|---|---|
| PEI | 89 | 79 | 69 |
| BaSO$_4$ | 10 | 20 | 30 |
| PET | 1 | 1 | 1 |
| Gloss at 60 ° | | | |
| shear rate = 8,500 s$^{-1}$ | 50 | 26 | 20 |
| shear rate = 10,000 s$^{-1}$ | 62 | 32 | 24 |
| shear rate = 12,000 s$^{-1}$ | 71 | 46 | 30 |
| shear rate = 15,000 s$^{-1}$ | 82 | 46 | 37 |

In each case, the surface gloss of the injection molded article increased with increasing shear rate during injection molding.

The composition of the present invention imparts improved surface gloss to articles molded therefrom and the method of the present invention imparts improved surface gloss to articles molded thereby.

What is claimed is:

1. A thermoplastic resin composition, comprising:
   (a) a polyetherimide resin;
   (b) an inert particulate filler; and
   (c) a gloss-enhancing additive selected from the group consisting of linear polysiloxane polymers, polyethylene resins and crystalline thermoplastic resins and mixtures thereof, in an amount that is effective to improve the surface gloss of articles molded from the thermoplastic resin composition.

2. The composition of claim 1, wherein the composition comprises, based on 100 parts by weight of combined amount of polyetherimide resin and particulate inert filler, from 35 to 99.9 parts by weight polyetherimide resin, from 0.1 to 65 parts by weight inert particulate filler and from 0.01 to 10 parts by weight gloss-enhancing additive.

3. The composition of claim 1, wherein the polyetherimide resin comprises structural units of the formula (I):

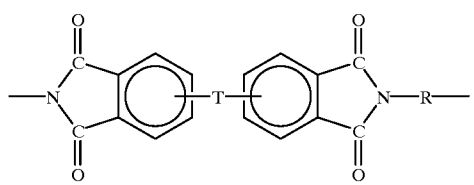

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

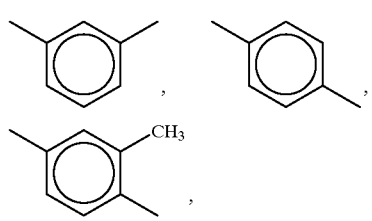

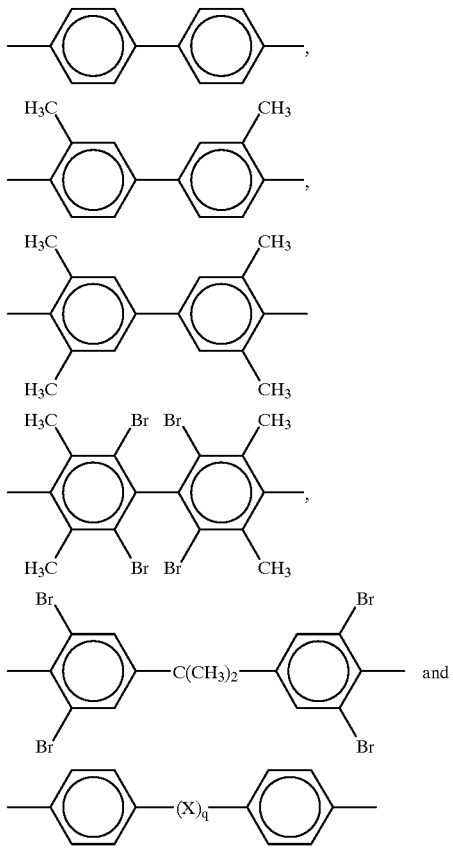

wherein X is a member selected from the group consisting of divalent radicals of the formulae (III):

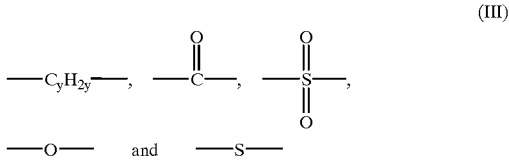

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

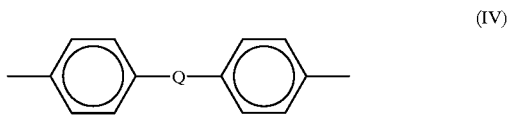

where Q is a member selected from the group consisting of formulae (V):

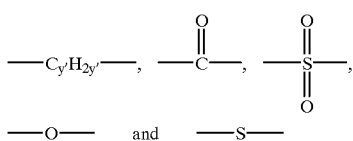

where y' is an integer from about 1 to about 5.

4. The composition of claim 1, wherein the polyetherimide resin is the reaction product formed by melt polymerization of 2,2-bis[4-(3,4-dicarboxyphenoxy)phenyl]propane dianhydride with metaphenylene diamine.

5. The composition of claim 1, wherein the polyetherimide resin has a molecular weight of from about 10,000 to about 65,000 grams per mole.

6. The composition of claim 1, wherein the polyetherimide resin has a molecular weight of from about 10,000 to about 55,000 grams per mole.

7. The composition of claim 1, wherein the inert particulate filler comprises a mineral filler selected from the group consisting of alumina, barium carbonate, barium sulfate, barium titanate, barium trioxide, bismuth trioxide, calcium carbonate, magnesium silicate, strontium ferrite, titanium dioxide, wollastonite, zinc oxide and mixtures thereof.

8. The composition of claim 1, wherein the inert particulate filler comprises barium sulfate.

9. The composition of claim 1, wherein the inert particulate filler has an average particle size of from about 0.2 micrometer to about 40 micrometers.

10. The composition of claim 1, wherein the composition comprises from 0.01 to 2.0 parts by weight, based on 100 parts by weight of combined amount of the polyetherimide resin and the inert particulate filler, of a methyl-terminated poly(dimethyl siloxane) or a poly(methyl hydrogen siloxane) fluid as the gloss enhancing additive.

11. The composition of claim 1, wherein the composition comprises 0.5 to 8 parts by weight, based on 100 parts by weight of combined amount of the polyetherimide resin and the inert particulate filler, of a high density polyethylene resin as the gloss enhancing additive.

12. The composition of claim 1, wherein the composition comprises 0.05 to 10 parts by weight, based on 100 parts by weight of combined amount of the polyetherimide resin and the inert particulate filler, of a crystalline thermoplastic resin as the gloss enhancing additive.

13. The composition of claim 12, wherein the crystalline thermoplastic resin comprises a crystalline thermoplastic polyamide resin.

14. The composition of claim 13, wherein the crystalline thermoplastic polyamide resin comprises a nylon 6 or a nylon 6,6.

15. The composition of claim 12, wherein the crystalline thermoplastic resin comprises a crystalline thermoplastic polyester resin.

16. The composition of claim 12, wherein the crystalline thermoplastic resin comprises a poly(alkylene terephthalate) resin.

17. A method for making a filled thermoplastic resin article, comprising molding the thermoplastic resin composition of claim 1 under molding conditions effective to subject the thermoplastic resin composition to a shear rate of greater than 8,500 reciprocal seconds.

18. The method of claim 17, wherein the molding conditions are effective to subject the thermoplastic resin to shear rate of greater than or equal to 10,000 reciprocal seconds.

19. The method of claim 17, wherein the molding conditions are effective to subject the thermoplastic resin to shear rate of greater than or equal to 12,000 reciprocal seconds.

20. A shaped article made by the method of claim 17.

21. A shaped article made by molding the composition of claim 1.

22. A thermoplastic resin composition, comprising the composition obtained by blending a polyetherimide resin, an inert particulate filler; and a gloss-enhancing additive selected from the group consisting of linear polysiloxane polymers, polyethylene resins and crystalline thermoplastic resins and mixtures thereof, in an amount that is effective to improve the surface gloss of articles molded from the thermoplastic resin composition.

* * * * *